Nov. 9, 1937.  E. K. BENEDEK  2,098,214.
HYDRAULIC MOTOR FOR ROTARY SPINDLE MACHINES
Filed June 16, 1936  4 Sheets-Sheet 1
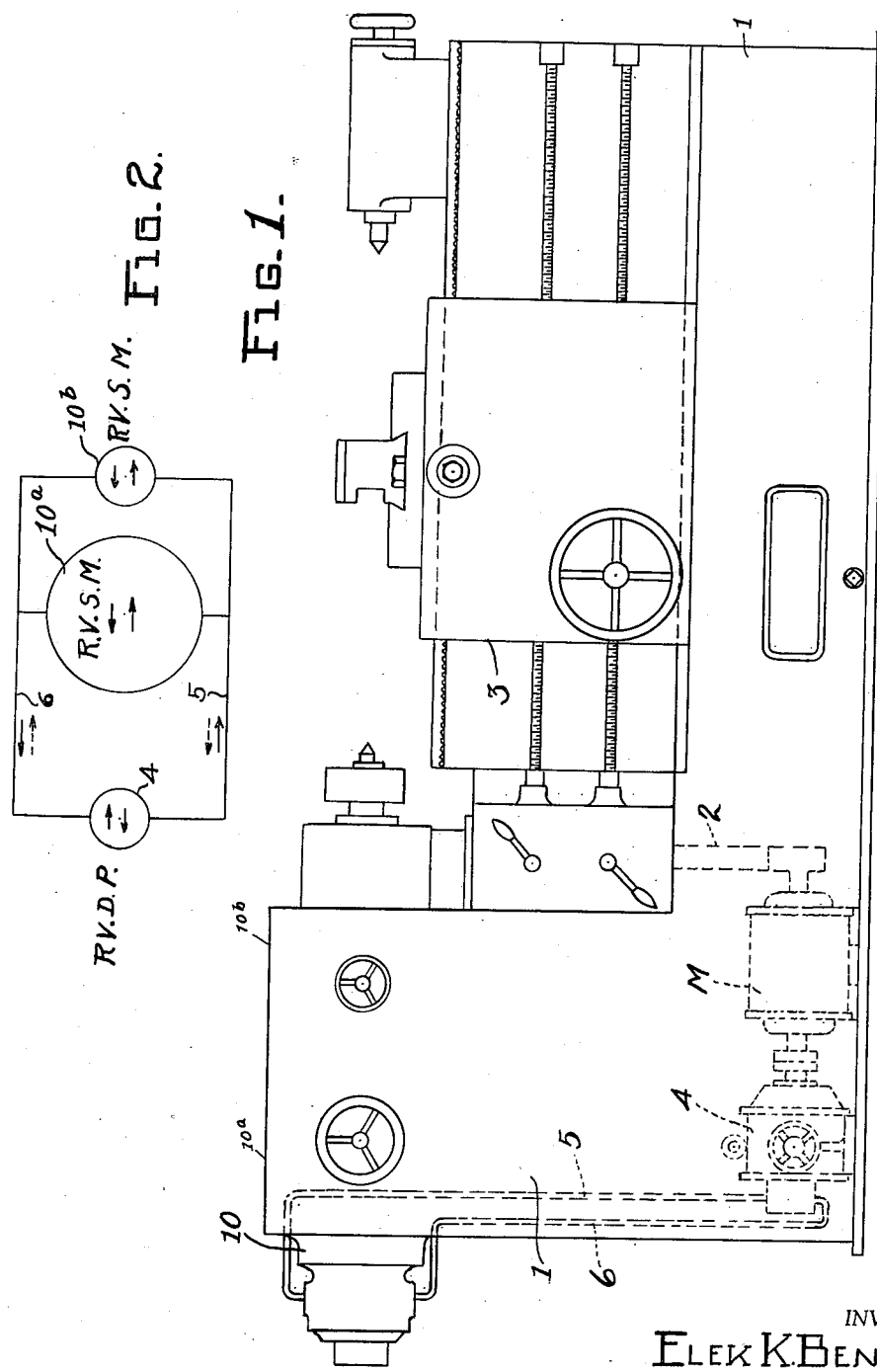
INVENTOR.
ELEK K BENEDEK
BY
his ATTORNEY.

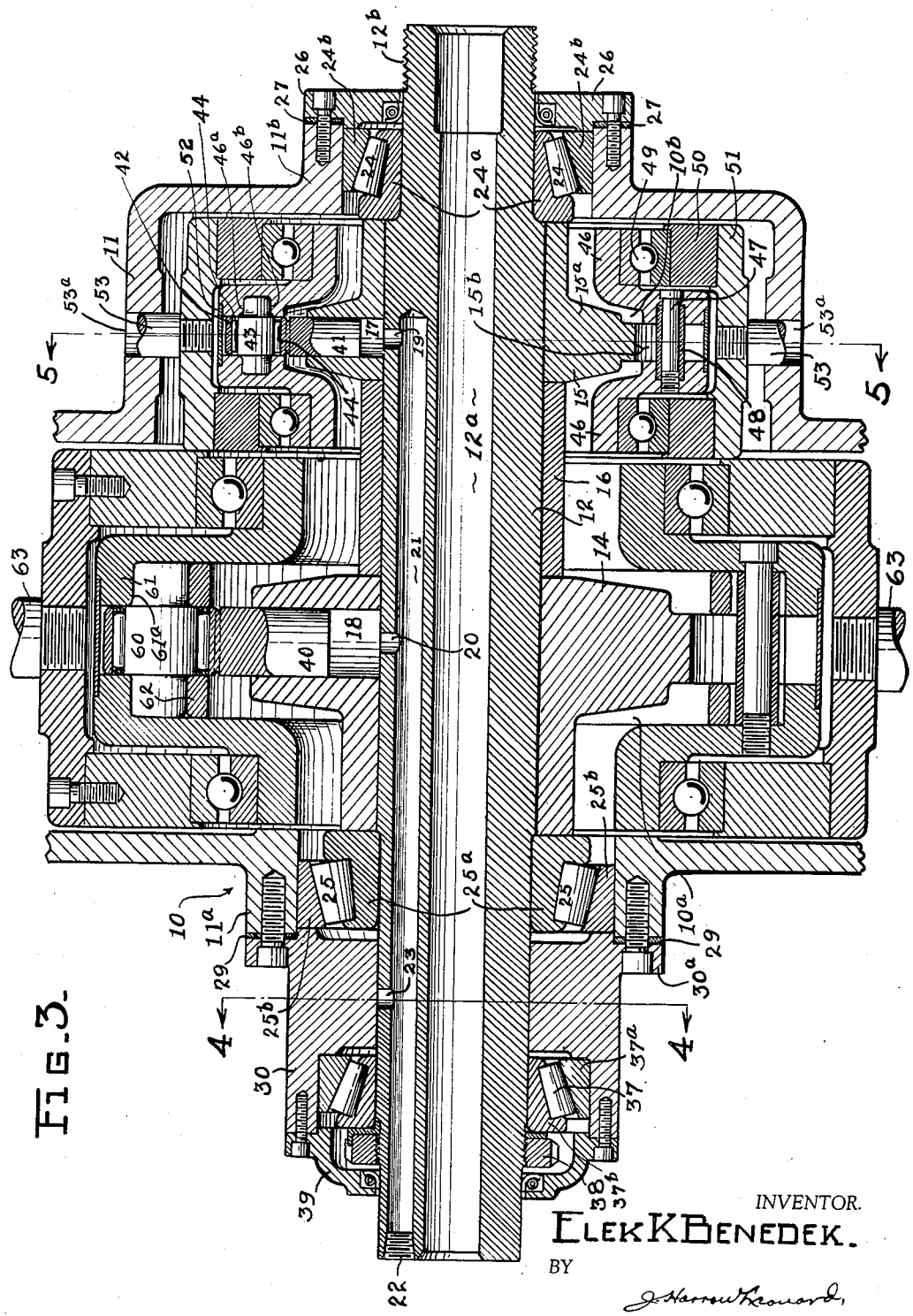

Nov. 9, 1937.  E. K. BENEDEK  2,098,214
HYDRAULIC MOTOR FOR ROTARY SPINDLE MACHINES
Filed June 16, 1936  4 Sheets-Sheet 3

INVENTOR.
ELEK K BENEDEK.
BY
J. Hansen Leonard,
his ATTORNEY.

Nov. 9, 1937.  E. K. BENEDEK  2,098,214
HYDRAULIC MOTOR FOR ROTARY SPINDLE MACHINES
Filed June 16, 1936  4 Sheets-Sheet 4
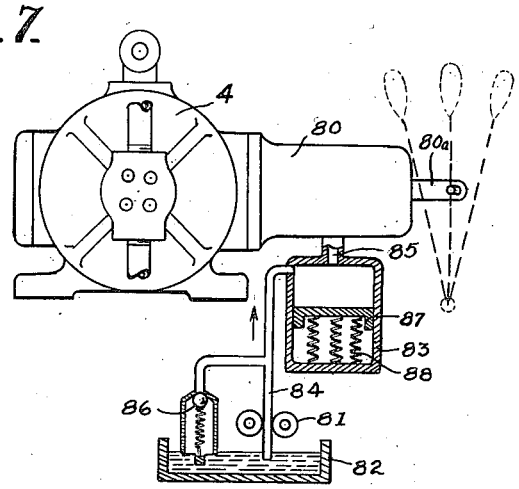
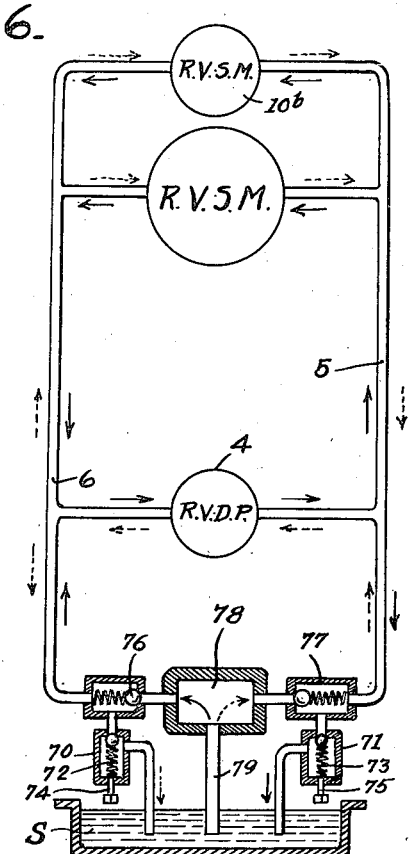
INVENTOR
ELEK K BENEDEK
BY
his ATTORNEY Patented Nov. 9, 1937

2,098,214

UNITED STATES PATENT OFFICE 2,098,214

HYDRAULIC MOTOR FOR ROTARY SPINDLE MACHINES

Elek K. Benedek, Bucyrus, Ohio

Application June 16, 1936, Serial No. 85,550

14 Claims. (Cl. 82—2)

This invention relates to a hydraulic motor for rotary spindle machines such as described in my copending application Serial No. 25,449, filed June 7, 1935, the present invention being an improvement on the structure therein disclosed.

Precision machine tool operation requires constant and smooth power flow to the work piece or tool. Mechanical gearing introduced between the prime mover or a hydraulic motor and the spindle of a rotary spindle machine introduces characteristics which render the smooth and constant flow of power unattainable and offset the advantages of the more flexible hydraulic drive. Fluid pressure power transmission as herein directly applied provides uniformity and smoothness of drive resulting in more precise cutting, longer tool life, and longer life of the machine itself. Vibrations and shocks which are introduced initially in the tool or work piece and which are ordinarily reflected in the machine due to slackness in mechanical gearing are damped by the hydraulic mechanism when the latter is provided with a proper circuit and directly connected to the tool or work piece. Such power application is especially desirable with certain high speed cutting tools such as those of tungsten carbide material.

The hydraulic mechanism of the present invention is designed to operate at a constant horsepower cycle efficiently throughout a very wide range, wherein, at the lower range of speed, torque becomes proportionately large and requires a heavy duty structure while at high speed the torque is relatively small and requires a light high speed structure.

One of the principal objects of the present invention is to meet these requirements as to range in a machine tool structure with a simple and economical fluid pressure drive directly connected to the head stock of a machine tool and having a fluid circuit by which shock and vibration are hydraulically cushioned, and by which the hydraulic mechanism can be rendered idle, or active, or reversed by means of the pump so that regardless of the setting of the motor speed, the head stock may be stopped and brought back to exactly the same speed at which it was originally operated and by which prompt and efficient braking of the motor may be readily obtained without vibration and jar.

More specific objects are to provide a durable and economical hydraulic structure which may be readily manufactured by the ordinary commercial processes; to provide efficient, precise bearings of small diameter in relation to the size of the structure which are so incorporated in the structure that they will withstand the required stresses with minimum wear and danger of overheating at high speeds; to provide a detachable wear resistant valve head for the fluid pressure motor by which adjustment, replacement and accurate positive radial clearance at all times between the spindle and valve portion can be obtained.

Other objects are to provide in a fluid pressure operated machine tool drive a large capacity motor stage unit which dominates the operating characteristics of the drive at low speed and high torque and a smaller capacity motor stage unit which dominates the operating characteristics at high speed and low torque, whereby a wide range of rated speeds, overspeed and underspeed, are obtainable at high efficiency.

Another specific object is to provide a compact bearing mounting for the low speed and high speed motor stage units by which the unsupported span of the spindle and the deflection thereof are reduced and greater precision and efficiency in operation attained.

Other objects and advantages will become apparent from the following specification wherein reference is made to the drawings, in which Fig. 1 is a diagrammatic front elevation illustrating a rotary spindle machine employing as the driving means the pressure fluid motor of the present invention;

Fig. 2 is a diagrammatic illustration of a fluid circuit employed in the present structure;

Fig. 3 is a horizontal sectional view through the axis of the motor of the present invention;

Fig. 6 is a diagrammatic illustration of the reversible fluid pressure circuit used in connection with the present motor;

Fig. 7 is a diagrammatic illustration of a control fluid circuit which may be used in connection with the present motor for controlling the operation thereof.

Figure 4:
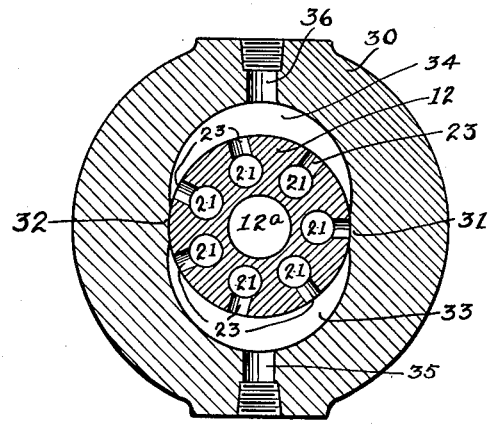
Fig. 4 is a sectional view of the detachable valve head of the present motor and is taken on a plane indicated by the line 4—4 in Fig. 3.

Referring to Fig. 1, for the purposes of illustration, the present fluid pressure motor is shown adapted for use in connection with a lathe for driving the head stock spindle. The particular lathe illustrated includes a housing and support 1 in which is a suitable prime mover, such as an electric motor M for the fluid pressure mechanism and which may be drivingly connected by a suitable belt 2 to the work feed mechanism 3 of the lathe.

Mounted in the housing 1 is a reversible variable delivery fluid pressure generator or pump 4 which is connected directly to the impeller shaft of the motor, suitable fluid mains 5 and 6 forming the fluid circuit therefrom to the hydraulic motor. The fluid mains 5 and 6 are connected to the fluid pressure motor 10, which is preferably mounted within the lathe housing 1 and extends therefrom at one end. The fluid mains 5 and 6 are reversible and connected in parallel with the stages of the motor 10, later to be described, this circuit being diagrammatically illustrated in Fig. 2 wherein the stages of the motor 10 are designated generally as 10a and 10b. In this diagrammatic showing, the fluid pressure generator and motor may be adjusted by suitable hand wheels, though a separate control circuit to be described is preferably used.

Figure 5:
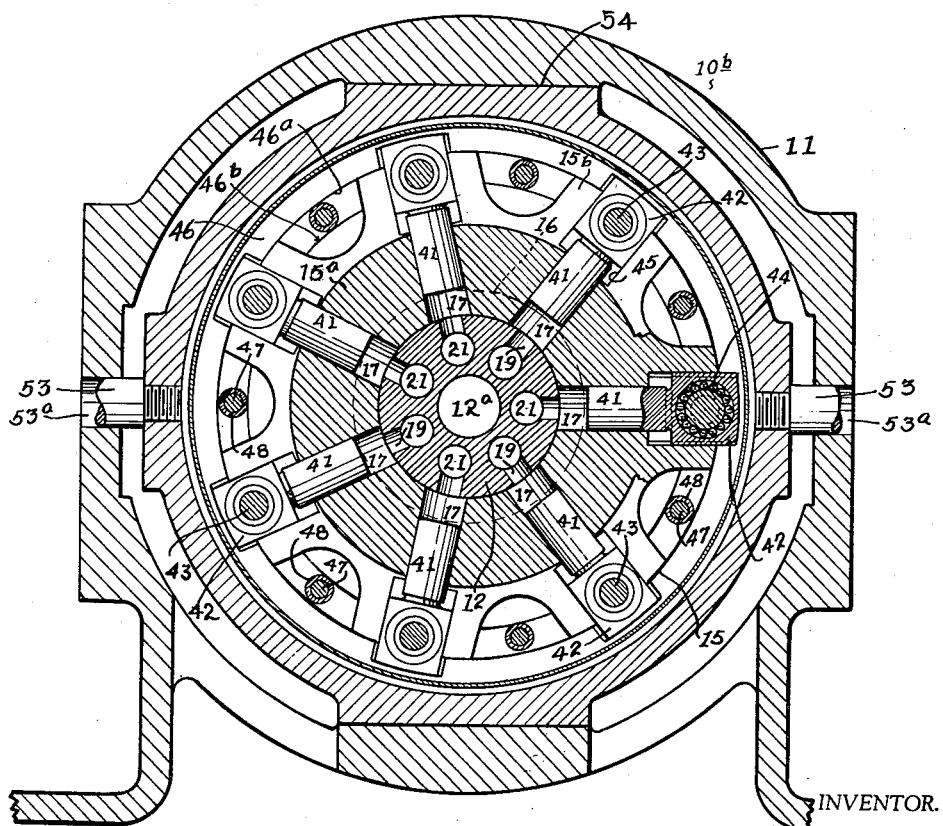
Fig. 5 is a sectional view of the smaller stage unit of the motor and is taken on a plane indicated by the line 5—5 in Fig. 3.

Referring next to Figs. 3 and 5, inclusive, the particular motor 10, comprising two stages 10a and 10b respectively, is illustrated. The motor structure is generally mounted in a rigid weight supporting casing 11, part only of which is shown, the casing having a hub portion 11a at the end adjacent the larger motor stage unit 10a, and having a hub portion 11b at the end adjacent the smaller stage unit 10b. The hub portions and the remainder of the casing are connected by suitable radially extending walls fitting closely the configuration of the internal structure of the motor.

Mounted within the casing 11 are the radial piston, fluid pressure motor stage units, two such units being shown for purposes of illustration. As set forth in the objects, it is desirable that the hydraulic motor be coaxial with and directly connected to the head stock of the machine tool. Under such conditions it is necessary that the spindle of the head tool and the motor itself have an axial passage open the full length thereof for accommodating the work piece.

To meet these requirements, a spindle 12 having an axial passage 12a which is open at both ends is provided, the end of the spindle adjacent the smaller stage unit 10b having a threaded end portion 12b by which a suitable chuck may be secured thereto. The spindle 12 must be extremely rugged so as to withstand the forces to which it is subjected and especially so as to withstand hydrostatic deflection, whereas the barrels of the stage units, due to their greater size and deeper cross section are better able to withstand such deflection. Accordingly, the spindle 12 and the barrels are separately formed, the spindle preferably being of high grade alloy steel capable of withstanding severe stresses while affording great rigidity. The spindle is preferably cylindrical so that it lends itself readily to precision in commercial production.

Mounted on the spindle 12 so as to form therewith a substantially unitary structure insofar as the operating characteristics are concerned, are the cylinder barrels 14 and 15 respectively of the motor stage units 10a and 10b. The barrels 14 and 15 are made from a different material from the spindle as the stresses to which they are subjected are different and the configuration of the barrels renders them more effective for resisting certain stresses. The barrels are preferably made of chrome nickel steel or cast iron with free graphite which provides good wear resisting cylinder wall surfaces for the reciprocating pistons, as will later be described. Each of the barrels 14 and 15 is provided with a straight axial bore which receives the spindle on which they are shrink fitted. Instead of shrink fitting the barrels onto the spindle, however, the barrels may be keyed thereto. The barrels are spaced the proper distance apart along the spindle and the spindle is reinforced between the barrels by a suitable spacer 16 which tightly fits the spindle. If desired, however, this spacer may be formed integral with one, or part with each of the barrels.

Since the barrels 14 and 15 are the same in form and function and differ only in size, the barrel 15 will be referred to specifically for illustrating the barrel and piston structure. The barrel 15 is provided with an enlarged diameter central portion 15a having a radial flange portion 15b, in the zone of which flange are radial cylinders 17. The cylinders 17 extend from the outer radial limit of the barrel and open into the axial bore thereof and are of constant diameter throughout their length as distinguished from cylinders having reduced cylinder ports which are formed in the barrel. Since the cylinder bores are of constant diameter, radial honing and lapping processes can be utilized for producing smooth and accurate cylinder walls in commercial production, as more fully described in my copending application Serial No. 71,539, filed March 30, 1936.

The larger stage unit barrel 14 is provided with radial cylinders 18 corresponding to the cylinders 17 in all respects except size. The cylinder ports for the respective sets of cylinders 17 and 18 are formed directly in the spindle 12 so as to lie substantially coaxial with the associated cylinders when the barrels are installed on the spindle. In the form illustrated, cylinder ports 19 are provided for the cylinders 17 and ports 20 for the cylinders 18. The set of cylinders 17 corresponds in number to the set of cylinders 18 and corresponding cylinders of each set are preferably positioned to lie with their axes in the same radial plane through the axis of rotation. Corresponding cylinders 17 and 18 are connected in parallel with each other through the medium of longitudinal ducts 21 in the spindle 12. The ducts 21 are formed by drilling into the spindle from one end and then plugging the open end, as indicated at 22. Each duct 21 communicates with an associated radial main port 23, the ports 23 being in valving cooperation with the valve head of the hydraulic motor, as will later be described.

For rotatably supporting the spindle 12, suitable oppositely acting sets of combination radial load and axial thrust bearings 24 and 25 are provided. These bearings are preferably located as near the corresponding ends of the barrels 14 and 15 as possible so as to reduce the unsupported spindle span. A rugged and accurate support for the spindle is required both for free operation without heating of the bearings at high speeds while at the same time withstanding exceedingly heavy torque and thrusts at the low speeds, both of which conditions the motor must fulfill.

For the purposes of illustration, the sets of bearings 24 and 25 are shown as tapered roller bearings. The bearings 24 operate on an inner race 24a which is tightly fitted on the spindle 12 and abuts the outer end of the barrel 15 and a slight radial shoulder on the spindle, as illustrated. The race 24a is preferably grooved to constrain the rollers 24 to fixed axial position relative to the race 24a and to permit free adjustment of the outer race of the bearing axially for effecting adjustments of the bearings 24 and to eliminate diametrical slackness. The barrel 15 and bearings 24 are so related that the bearings lie in a radial plane through the hub portion 11b of the casing. Slide fitted within the hub portion 11b of the casing is the outer race 24b of the bearings 24, this race being adjustable and held in adjusted position by a cover plate 26 which abuts the outer end of the race 24b and is bolted to the casing hub 11b. Suitable shims 27 are interposed between the plate 26 and casing hub to adjust the position of the race 24b.

Correspondingly, the bearings 25 operate in an inner race 25a and outer race 25b, the latter being slidably supported in the hub portion 11a of the casing for adjustment axially. The adjustment of the race 25b is effected through the medium of the valve head 30 of the motor, shims 29 being interposed between the valve head and the casing hub 11a for adjusting the positions of the valve head and race 25b.

A portion of the spindle 12 extends beyond the hub 11a and the radial valve ports 23 of the spindle are located in the extending portion. For effecting valving cooperation with the ports 23 a separate detachable valve head 30 is provided, the valve head having a radial flange 30a through the medium of which it is bolted to the end of the hub 11a of the housing so as to form therewith a substantially uniform structure while at the same time affording a means for adjusting the diametral clearance of the bearing 25. The valve head 30 is provided in the zone of the ports 23 with a valve portion having diametrally opposite internal bridges 31 and 32 and internal recesses 33 and 34, the recesses being segregated from each other by the bridges and spindle. The recesses 33 and 34 communicate respectively with radial ducts 35 and 36 formed in the valve head portion, these ducts being tapped for connection to the external fluid pressure mains 6 and 5, respectively, for completing the hydraulic circuit.

The recesses 33 and 34 are preferably arcuate, being formed by two parallel bores having their axes offset radially of the valve head 30 from the axis of rotation. The bridges 31 and 32 have operating surfaces which are formed by a single bore coaxial with the spindle. Thus both the bridges 31 and 32 and the recesses 33 and 34 may be accurately formed by the usual commercial methods of production and are accessible for finishing to the degree of precision desired. The valve head 30 also has an annular shoulder which fits within the end portion of the hub 11a so as to center the head in coaxial relation therewith and with the spindle, and has a radial flange by which it is secured to the casing hub 11a. The valve head 30 is preferably of a material different from the spindle and the barrel and of such a material that high efficiency in lubrication during relative rotation is provided as distinguished from high efficiency in lubrication in the case of the hardened pistons and barrel. The spindle is preferably hardened and ground and both spindle and head are accurately finished.

At its outer end the valve head has an enlarged counterbore which accommodates combination radial load and axial thrust bearings 37, the outer race 37a of which is fixedly secured in axial position within the valve head and the inner race 37b of which is slidably mounted for axial adjustment on the spindle. A suitable lock nut 38 is threaded onto the end of the spindle for adjusting the inner race 37b so as to maintain the proper coaxial relation between the valve head 30 and spindle. A suitable cover plate 39 is secured to the end of the valve head 30 so as to substantially seal the end thereof.

This combination provides several distinct advantages, one being that the spindle 12, the barrels 14 and 15, and the valve head 30 each may be of the particular material which is best adapted to withstand the partciular forces, wear and operating conditions to which the part is subjected. Other advantages are that wear or damage to any one part does not necessitate an expensive replacement of the entire motor but only the replacement of the particular damaged part. Each part is of such simple configuration and so accessible throughout that it may readily be made with a high degree of precision by the usual quantity production methods, thus making it possible for the structure to compete commercially with mechanical gearing. Again, standard commercial parts which are relatively inexpensive as compared to special accessory parts can be employed in the structure and effective adjustment of the parts with respect to each other so as to overcome manufacturing inaccuracies and the like can be obtained.

Referring next very briefly to the pistons and associated reactance of each barrel, suitable radial pistons 40 and 41 are mounted in the cylinders 16 and 17 respectively. Since the pistons and reactance are the same for the stages, the smaller stage 10b only will be described in detail.

As better illustrated in Fig. 5, each of the pistons 41 has a crosshead 42 which is preferably formed integral therewith and in which is rotatably mounted a crosspin 43, the crosspin being mounted on capillary cageless needle rollers 44 and projecting beyond the crosshead in each direction parallel to the axis of rotation. The crossheads 42 operate in suitable guideways 45 formed in the radial flange 15b of the barrel 15.

Surrounding the pistons is a rotary reactance means comprising matched rings 46. For connecting the rings 46 together to form a rigid unitary reactance structure, suitable tie bolts 47 are provided, the tie bolts carrying rigid compression spacers 48 so that, at all portions about its periphery, the resulting rotary reactance structure is supported against outward spreading or inward cramping. The rings 46 have hub portions through the medium of which they are supported on suitable anti-friction bearings 49 in stator rings 50, the stator rings, in turn, being mounted in an adjustable reactance stator 51. The bearings 49 are preferably combination load and thrust bearings so as to secure the rings in fixed coaxial position and proper axial position. The rings, when mounted as described, present parallel radial walls forming a circumferential recess within which the piston heads 42 and crosspins 43 are accommodated. Each ring is provided with inner and outer reactance trackways 46a and 46b with which the crosspin ends are in rolling cooperation. The outer peripheral limits of the rings 46 are closed by a suitable oil retaining ring 52 so that the pistons and crosspins operate in an oil pressure bath at all times. Adjustment of the reactance is effected through the medium of diametrically opposite control rods 53 which are connected to the stator, the stator 51, in turn, being supported and guided on parallel diametrically opposite plane bearing surfaces 54 in the housing. The rods 53 operate in suitable bores 53a in the casing 11. The bores 53a, though shown as snugly fitting the rods 53, are, in fact, oversize so that the rods and stator may be moved axially during adjustment of the bearings, as will later be described.

The pistons 40 are correspondingly provided with rotatable crosspins 60 cooperating with reactance rings 61 having outer reactance trackways 61a. Instead of the inner trackways being formed directly on the rings 61, however, separate floating rings 62 are provided. Thus the radial walls and trackways 61a may be more easily finished by the usual commercial grinding and finishing methods and the rings 62 finish ground readily on all surfaces. The adjustment of the reactance in the large stage unit 10a is effected by the control rods 63.

Referring next to Fig. 6, the hydraulic circuit of the present structure and the valve arrangement therein, permitting prompt and efficient reversal, is illustrated. In the structure heretofore described, both the motor and the fluid pressure generator are reversible, though generally, after the motor is set for a given speed, reversal and idling are thereafter effected during the machining operation through the medium of the fluid pressure generator or pump. In each of the mains 5 and 6 are high pressure, one-way relief valves 70 and 71 which discharge into a suitable sump S so that in event of extreme pressure occurring, due to action on the tool or to reversal of drive, the excess fluid pressure will be relieved regardless of which of the mains 5 and 6 is the instantaneous pressure main. The degree of pressure at which the valves 70 and 71 open is controlled by springs 72 and 73 respectively, the tension of which may be adjusted by suitable adjusting screws 74 and 75 respectively. The mains 6 and 5 are provided with check valves 76 and 77, the valves being seated by light springs of only sufficient strength to retain the valves in operating position. A common suction chamber 78 is connected in the mains 5 and 6 beyond the check valves toward the sump so as to be separated therefrom by the valves, the suction chamber, in turn, communicating with the sump through a suitable conduit 79.

It is apparent that in this circuit the normal flow is from the fluid pressure generator directly to the motor stage units which are in parallel with each other and with the generator, and through these units back to the generator 4. However, due to slip fluid and other losses, it is necessary that replacement fluid be provided. If the main 6 is the instantaneous pressure line, the valve 76 is closed and the valve 77 is operative to open and admit more fluid to the main 5. During the reverse operation the valve 77 is held closed by the fluid pressure and the valve 76 opens to admit replacement fluid to the main 6. The circuit thus provided assures maintenance of a full circuit at all times and permits instantaneous reversal and braking of the motor.

In machine tools it is necessary that starting, stopping, and reversal and all operations be extremely rapid, as the more rapid these actions, the sharper and more accurate will be the resultant work. In addition there will be a considerable saving in time and operating expense.

In order to provide for rapid control of the pump 4 or motor stage units, the control circuit illustrated in Fig. 7 may be employed, this circuit, in turn, being connected with suitable pilot controlled, follow-up servo-motors which may operate the rods 53 and 63 of the motor stage units and a similar control rod of the pump, respectively. Such servo-motors are more fully described and illustrated in my copending application, Serial No. 749,746, filed October 24, 1934, and Serial No. 754,753 filed November 26, 1934. In Fig. 7 is shown the pump 4 hereof, the servo-motor 80 used in connection therewith being illustrated. The secondary fluid circuit is operated by a suitable low pressure rotary pump 81 which draws fluid from the sump 82 and discharges the fluid into a pressure accumulator 83. The purpose of the accumulator is to store a large amount of fluid in a very short interval of time in order that the pump 4 or motor 10 may be reversed or adjusted almost instantaneously, otherwise a large auxiliary pump would be necessary.

The accumulator is fluid tight and is connected to the pump 81 by the line 84 and in turn is connected to the servo-motor 80 by the line 85, a relief valve 86 being connected to the line between the accumulator 83 and the pump 81 to prevent damage by excessive pressure. The accumulator 83 comprises a piston 87 which is urged toward discharge position by helical springs 88 of predetermined compressive strength. A large number of helical springs instead of a single large spring are used so that the accumulator will be more sensitive and more quickly responsive to the demands of the pilot lever 80a and associated pilot piston of the servo-motor 80. If desired, both the pump 4 and the stage units 10a and 10b of the motor 10 may be provided with servo-motors of the same general type and similarly connected to the control circuit so that different operating settings may be obtained. However, since the motors are usually run for considerable intervals with a single motor setting, the usual hand wheel may be used to operate the motor control rods 53 and 63, as illustrated in Fig. 1. In operation, when the motor speed for a given operation is set, the stopping and reversing is done by setting the pump, as reversal, zero stroke and maximum stroke positions of the pump can always be returned instantly to exactly the original setting without requiring careful resetting by the operator.

Advantages of the multi-stage motor over a single stage motor should be considered. The torque of a hydromotor is directly proportional to the specific operating pressure $p$, in pounds per square inch, and to the specific volume $v$ of the motor unit in cubic inches displacement of all of the pistons per revolution of the motor. From this it follows that insofar as the pressure $p$ is the same, a motor having fluid capacity $v$ will deliver more torque at less speed than a motor having less fluid capacity. Insofar as two motor stages have the same fluid capacity $v$, at the same pressure, they will deliver the same torque. Thus, for a given pressure $p$, torques of different size units are related as are their specific volumes, expressed by the equation torque equals pressure times volume:

$$T = (K)p \times v \quad \text{Equation (1)}$$

Also $$H.P. = K(T \times \text{Speed}) \quad T = K\left(\frac{HP}{3}\right) \quad \text{Equation (2)}$$

In these formulae unit pressure and specific volume are used, size, as herein referred to, meaning fluid capacity as well as structural size necessary to withstand the torque without damage. Thus Equation (1) shows that a smaller motor unit could be made to transmit as much or more torque, if it is made of sufficiently strong structural material, than could a larger size motor unit operating at less pressure, the greater pressure and smaller volume constituting a larger output than a less pressure and larger volume. Therefore, for constant speed output, $p$ and $v$ will vary in certain predetermined relation. If the pressure is kept constant as well as the horsepower, different speeds must result from different capacities, and likewise the different speeds of constant power result in largely different torques.

Thus $$T = (K)\frac{HP}{S}$$

Assuming horsepower is constant, there $T=C/S$, Equation (3).

By these simple equations it is indicated that torque is inversely proportional to speeds and directly proportional to capacity $v$. Thus, by using two different capacity stages, a design is provided which is in conformance with both the theoretically perfect design and the practical exigencies, as constant horsepower is desired and the same fluid pressure for each stage is almost a practical necessity. Further, this is in keeping with the practical concept of a large rugged unit necessary to withstand the great torque and to be operated at lower speed and a small light unit which is necessary for high speed wherein torque is not so great a factor. In the form shown, the small stage 10b is not subjected to the great torque of the larger stage 10a, the torque from the latter being transmitted directly through the spindle 12.

To best appreciate the advantages of the present structure, the following practical operating cycle is described as one specific example. One of the important problems of machining is the braking of the work by some means so that the operator may perform a preliminary or trial cut, stop and hold the work, then use his micrometer to check the work, and finally start the work again. Since the cycle is reversible by means of the pump, the motor will be stopped by setting the pump to zero. Having stopped the work by setting the pump to zero and checked the diameter of the work, the operator establishes the most favorable cutting speed and sets the motor stroke to a certain point which will give this required speed when the pump is operating at full stroke. It is desirable that this favorable cutting speed be maintained thereafter, even though the operator must stop occasionally to measure and recheck the work. For this purpose, the pump is merely set to zero stroke whereupon it will act as a brake and lock the motor by the hydraulic fluid. Having checked the work the operator then may set the pump to full stroke and the motor will start again and operate at the same stroke and at the same speed at which it was originally operating.

To reverse the drive, it is only necessary to shift the pump toward and beyond minimum stroke to the reverse stroke condition and thereby the work will be brought rapidly, but in continuous drop, to zero without jar or vibration and the speed will immediately be increased rapidly but as a continuous rise in the reverse direction. This is especially desirable as the quicker the reversal, the sharper and more accurate is the finish, and the speed in reverse will be exactly the same as the forward speed. In addition, considerable time is saved by the quick and accurate settings. As explained, the motor stroke is usually adjusted more carefully and slowly whereas the pump stroke may be rapidly reversed particularly when a servo-motor is utilized for adjusting the pump stroke.

Having thus described my invention, I claim:

1. In a rotary spindle machine, a casing, a rotary radial plunger, hydraulic motor carried in the casing, said motor comprising a rotatable barrel, radial cylinders therein, plungers reciprocable in the cylinders respectively, reactance means for the plungers, fluid ducts in said barrel connected with said cylinders respectively, each duct being continuously in communication with its associated cylinder, anti-friction radial and axial thrust bearings mounted in the casing and supporting the barrel at both ends for rotation therein, an end portion of the barrel extending endwise beyond the associated bearings and having valve ports respective to said ducts, a valve head surrounding said barrel portion and having ports in valving cooperation with said valve ports, means detachably securing said valve head to the casing, and anti-friction bearings carried by said head and in cooperation with said barrel for constraining the head and barrel to coaxial relation.

2. In a rotary spindle machine, a casing, a rotary, radial plunger, hydraulic motor carried in the casing, said motor comprising a rotatable barrel, radial cylinders therein, plungers reciprocable in the cylinders respectively, reactance means for the plungers, fluid ducts in said barrel connected with said cylinders respectively, each duct being continuously in communication with its associated cylinder, said barrel having a portion with valve ports connected with the ducts respectively, anti-friction radial and axial thrust bearings mounted in the casing and supporting the barrel at its ends for rotation therein and constraining the barrel to substantially fixed axial position, a portion of the barrel extending endwise beyond the associated bearings and having valve ports for said ducts, a valve head detachably secured to the casing and fitting said portion of the barrel for valving cooperation, said head being adjustable axially of the casing, and means carried by the head and cooperating with said associated bearings for adjusting the same consequent upon adjustment of said head.

3. In a rotary spindle machine, a casing, a rotary, radial plunger, hydraulic motor carried in the casing, said motor comprising a rotatable barrel, radial cylinders therein, plungers reciprocable in the cylinders respectively, reactance means for the plungers, fluid ducts in said barrel connected with said cylinders respectively, each duct being continuously in communication with its associated cylinder, anti-friction radial and axial thrust bearings mounted in the casing and supporting the barrel at each end for rotation therein, means for adjusting said bearings for controlling the position of the barrel and the slackness thereof, said barrel having a portion extending endwise beyond the associated bearings and valve ports for said ducts in said portion, a valve head carried by the casing in surrounding relation to the said barrel portion and having ports in valving cooperation with the ports of the barrel, and anti-friction bearings in said head in cooperation with said barrel portion for constraining the head and barrel portion to coaxial relation, and means for adjusting the last named bearings independently of the other bearings.

4. In a rotary spindle machine, a casing, a rigid rotary spindle, anti-friction bearing means supporting said spindle in the casing for rotation about the spindle axis, a plurality of coaxial hydraulic motor stage units carried on the spindle for rotation therewith, each of said motor stage units comprising a rotatable barrel and cylinder and piston assemblies carried thereby, and independently adjustable reactances for the assemblies of the respective units, and each of said units being of different diameter and capacity, ducts in the spindles for the cylinders, each duct connecting one cylinder of one unit in parallel with one cylinder of the other unit, said spindle having ports respective to the ducts, a valve head in valving cooperation with the said ports and carried by the casing.

5. In a rotary spindle machine, a casing, a substantially cylindrical rigid hardened spindle, anti-friction means rotatably supporting the spindle in the casing, a barrel of different and softer material fitted on the spindle and forming a substantially unitary structure therewith, said barrel having radial cylinders of constant diameter throughout their length, said spindle having passages and ducts connecting certain of the passages with certain of the cylinders, pistons in the cylinders respectively, reactance means mounted in the casing and in cooperation with the pistons for reciprocating the same, said spindle having valve ports connected to the passages, and a valve head of material different from the material of the barrel carried by the casing and having ports in valving cooperation with the ports of the spindle.

6. In a rotary spindle machine, a casing, a rigid hardened spindle of circular cross section, anti-friction means rotatably supporting the spindle for rotation about its axis in the casing, a barrel of different material from the spindle and fitted thereon to provide a substantially unitary structure therewith, said barrel having radial cylinders, said spindle having passages and ducts connecting the passages with the cylinders respectively, hardened pistons in the cylinders respectively, reactance means mounted in the casing and in cooperation with the pistons for reciprocating the same, said spindle having valve ports for said passages, a valve head of different material from the spindle carried by the casing and having ports in valving cooperation with the ports of the spindle, said spindle and valve head being of materials providing in cooperation high efficiency in maintaining lubrication under relative rotation, and said barrel being of a material providing in cooperation with hardened pistons, a high efficiency in maintaining lubrication under relative reciprocation.

7. In a rotary spindle machine, a casing, a substantially cylindrical rigid spindle, anti-friction bearings supporting said spindle at each end, longitudinal passages in said spindle, a plurality of cylinder barrels tightly fitting on said spindle in coaxial relation therewith and with each other and spaced apart axially thereof, spacer means interposed between said barrels and tightly fitted on and reinforcing the spindle between the barrels, pistons carried in the cylinders of each barrel respectively, independently adjustable reactance means for the pistons of each barrel, said spindle having ducts continuously connecting certain of the passages with certain of the cylinders and with corresponding cylinders of each barrel in parallel, another portion of said spindle having radial ports respective to said passages, and a valve head detachably connected to the casing and in valving cooperation with the radial ports of said spindle.

8. In a rotary radial piston pump or motor mechanism including a barrel, piston and cylinder assemblies carried thereby, valve means for the assemblies, and an adjustable reactance for the assemblies and having a fluid controlled device for adjusting said reactance, a control circuit for supplying fluid pressure for operating said control device comprising means to supply fluid under pressure and connected to a source of fluid, a circuit connecting said means and said device, and an accumulator connected in said circuit between the pump and device, said accumulator including an expansible and contractable chamber for fluid and means rendering said chamber expansible and contractable while maintaining the fluid therein at substantially constant pressure and said chamber having a large fluid storage capacity relative to the amount of fluid utilized for an actuation of said device.

9. In a rotary radial piston pump or motor mechanism including a rotatable barrel, piston and cylinder assemblies carried thereby, valve means for the assemblies, and an adjustable reactance for the assemblies, and a fluid controlled device for adjusting said reactance, a control circuit for supplying fluid pressure for operating said control device comprising means for supplying a source of fluid under pressure to said device, a circuit connecting said means and device, and an accumulator connected in said circuit and having a large fluid storage capacity relative to the amount of fluid utilized for an actuation of said device, said accumulator including an expansible and contractable chamber for the fluid, and a plurality of small springs urging said chamber to contracted condition and rendering said chamber expansible and contractable while maintaining the fluid therein at substantially constant pressure therein and in said circuit.

10. In a fluid pressure operated apparatus, a reversible stroke, variable speed motor, a reversible variable delivery pump, reversible conduit means operatively connecting the pump and motor and forming a reversible circuit, relief valve means in said circuit and disposed operatively between the pump and motor and opening to relieve pressure therein above a predetermined positive pressure and to seal against the inlet of air or fluid thereinto, whereby the stroke of the motor may be reversed without reversing the pump, means connecting said pump to a source of fluid, check valve means disposed operatively between the pump and source of fluid and operative to admit fluid to said circuit from said source and to block return of said fluid to said source.

11. In a fluid pressure operated apparatus, a reversible stroke, variable speed motor, a reversible variable delivery pump, a pair of conduit lines connecting the pump and motor and providing with the internal circuits of the pump and motor a reversible circuit, relief valve means in said circuit and comprising relief valves respective to said lines and connected to the associated lines operatively between the pump and motor and opening to relieve the pressure in the associated lines and to seal against the inlet of air or fluid thereinto, whereby the stroke of the motors may be reversed without reversing the pump, means connecting both of said lines to a source of fluid, check valve means respective to said lines and disposed operatively between the pump and source of fluid, each check valve means being operable to admit fluid to the associated line from said source and to block return of said fluid to said source.

12. In a hydraulically operated apparatus having a reversible variable speed motor, and means for reversing the stroke of said motor, a reversible variable delivery pump, main conduit means connecting the pump and motor and forming a circuit, relief valves operatively interposed in each side of the circuit means between the pump and motor, whereby the motor may be reversed directly without reversing the pump, supplemental conduit means respective to and operatively connecting each side of the circuit to a source of fluid, check valve means in said supplemental conduit means respectively and operative to admit fluid to either of said supplemental conduit means and to block the return of fluid therethrough, whereby reversal of the motor may be effected by reversing the circuit and without reversing the motor stroke.

13. In a hydraulically operated apparatus having a reversible variable speed motor and means for reversing the stroke of said motor, a reversible variable delivery pump, conduit means connecting the pump and motor in a circuit, relief valves connected to both sides of the circuit and between the pump and motor for relieving pressure in said circuit consequent upon reversal of the motor, means connecting the pump to a source of fluid, check valve means in said last named means operative to admit fluid to the pump from a given source in either direction of operation and to block the return of fluid to said source, means for adjusting the seating pressure of said relief valve means, whereby the said relief valve means relieve the pressure in the instantaneous pressure side of the circuit consequent upon increase in said pressure beyond a predetermined maximum and said motor may be reversed selectively by reversing the stroke thereof independently of the reversal of the pump, and by reversing the delivery of the pump.

14. In a hydraulically operated device, a rotary reversible variable delivery fluid pump, a plurality of variable speed reversible rotary fluid motor units, an external circuit connecting said motor units in parallel with each other and with said pump, including reversible conduits, the main conduits being connected to a source of fluid, check valve means respectively operatively associated with the main conduits and operative to admit fluid thereto from the said source and to block the return of said fluid in the opposite direction, relief valves operatively associated with said conduits respectively between the pump and motor units whereby the pressure circuit can be reversed consequent upon reversal of the pump or motor units.

ELEK K. BENEDEK.